United States Patent
Liu

(10) Patent No.: US 7,364,374 B2
(45) Date of Patent: Apr. 29, 2008

(54) BI-DIRECTIONAL OPTICAL SIGNAL TRANSMITTING AND RECEIVING DEVICE

(75) Inventor: Daniel Liu, Hsin-chu (TW)

(73) Assignee: TrueLight Corporation, Hsin-Chu (TW)

(*) Notice: Subject to any disclaimer, the term of this patent is extended or adjusted under 35 U.S.C. 154(b) by 0 days.

(21) Appl. No.: 11/533,849

(22) Filed: Sep. 21, 2006

(65) Prior Publication Data

US 2008/0075409 A1   Mar. 27, 2008

(51) Int. Cl.
   *G02B 6/36*   (2006.01)
(52) U.S. Cl. .................... 385/93; 385/88; 385/89; 385/90; 385/91; 385/92; 385/94
(58) Field of Classification Search ............. 385/88–94
See application file for complete search history.

(56) References Cited

U.S. PATENT DOCUMENTS

| | | | |
|---|---|---|---|
| 5,127,075 A | 6/1992 | Althaus et al. | |
| 5,347,605 A | 9/1994 | Isaksson | |
| 5,408,559 A | 4/1995 | Takahashi et al. | |
| 5,838,859 A * | 11/1998 | Butrie et al. | 385/92 |
| 5,841,562 A | 11/1998 | Rangwala et al. | |
| 6,075,635 A | 6/2000 | Butrie et al. | |
| 7,093,988 B2 * | 8/2006 | Tsumori | 385/93 |
| 2006/0013541 A1 * | 1/2006 | Plickert et al. | 385/89 |
| 2007/0098335 A1 * | 5/2007 | Baek et al. | 385/93 |

FOREIGN PATENT DOCUMENTS

| | | |
|---|---|---|
| TW | 588889 | 5/2004 |
| TW | M241891 | 8/2004 |
| TW | M241892 | 8/2004 |
| TW | M246900 | 10/2004 |
| TW | M250458 | 11/2004 |

* cited by examiner

*Primary Examiner*—Michelle R. Connelly-Cushwa
*Assistant Examiner*—Eric Wong

(57) ABSTRACT

A bi-directional transmitting and receiving device for the connection of optical fiber is mainly to apply one side of a T shape shell to connect an optical fiber, while another side of the shell in line with the optical fiber is arranged an optical transmitter, with an optical receiver being arranged at the third side of the shell, wherein the optical transmitter is a packaging structure of Transistor Outline can (TO-can) having a cup shape lid, of which underside is inclined 45 degrees to transmitted light beam, and wherein a hollow window in the underside of the lid is arranged a light splitting filter, which is just positioned at the beam path of the optical receiver.

4 Claims, 4 Drawing Sheets

BI-DIRECTIONAL OPTICAL SIGNAL TRANSMITTING AND RECEIVING DEVICE

BACKGROUND OF THE INVENTION

1. Field of the Invention

The present invention relates to an optical signal transmitting and receiving device, and particularly to a bi-directional transmitting and receiving device of light-splitting type.

2. Description of Prior Art

As shown in FIGS. 1 and 2, a bi-directional optical signal transmitting and receiving device 1 according to the prior art is mainly to combine an optical transmitter 11 and an optical receiver 12 within a T shape shell 10, one side of which is connected to an optical fiber 13, and other two sides of which respectively accommodate the optical transmitter 11 and the optical receiver 12, while there are two focusing lenses 15, 16 arranged on optical transmitting surface of optical transmitter 11 and optical receiving surface of optical receiver 12 respectively. A light splitting filter 14, fixed at the intersection of two beam paths formed among optical transmitter 11, optical receiver 12, and optical fiber 13, is inclined 45 degrees to two beam paths. One side of the light splitting filter 14 facing both optical receiver 12 and optical fiber 13 is coated with a reflecting coating, so that light beam coming from optical fiber 13 may be reflected downward to the optical receiver 12 by the reflecting coating of light splitting filter 14, while the light beam coming from optical transmitter 11 may pass through light splitting filter 14 and transmit directly into optical fiber 13.

There are many assembling aspects for the prior light splitting filter arranged in a shell to generate optical operational relationship for taking care the distribution of optical signal transmitting and receiving paths among optical transmitter, optical receiver, and optical receiver, such as U.S. Pat. Nos. 6,075,635, 5,841,562, 5,838,859, 5,408,559, 5,347,605, and 5,127,075, as well as Taiwan Patent Application No. 250458, 246900, 241892, 241891, and 588889, wherein the light splitting filter 14 is directly arranged at a fixative seat formed or arranged in the interior of shell.

The light splitting filter of bi-directional optical signal transmitting and receiving device disclosed by aforementioned prior arts is an individual component that must be fixed in the interior of shell through a particular positioning and packaging procedure, such that its manufacturing process is more sophisticated and accurate. As a consequence, its producing cost is higher and it is difficult to reduce the volume of shell, because the machining process for the light splitting filter must be more complicated and dedicated, as smaller the volume of shell is, less favorable for the positioning and machining of light splitting filter are.

SUMMARY OF THE INVENTION

The present invention is to overcome the drawbacks mentioned in above prior arts by providing an optical transmitter adopted with a simplified TO-can framework, which integrates light splitting filter and lid of optical transmitter to make light splitting filter become one part of optical transmitter, so there is no additional positioning structure and machining process needed for the light splitting filter. As a result, the size of shell is shrunk and there is no more limitation caused by the positioning structure of light splitting filter.

BRIEF DESCRIPTION OF DRAWING

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

In cooperation with attached drawings, the technical contents and detailed description of the present invention will be as follows.

Figure 1:
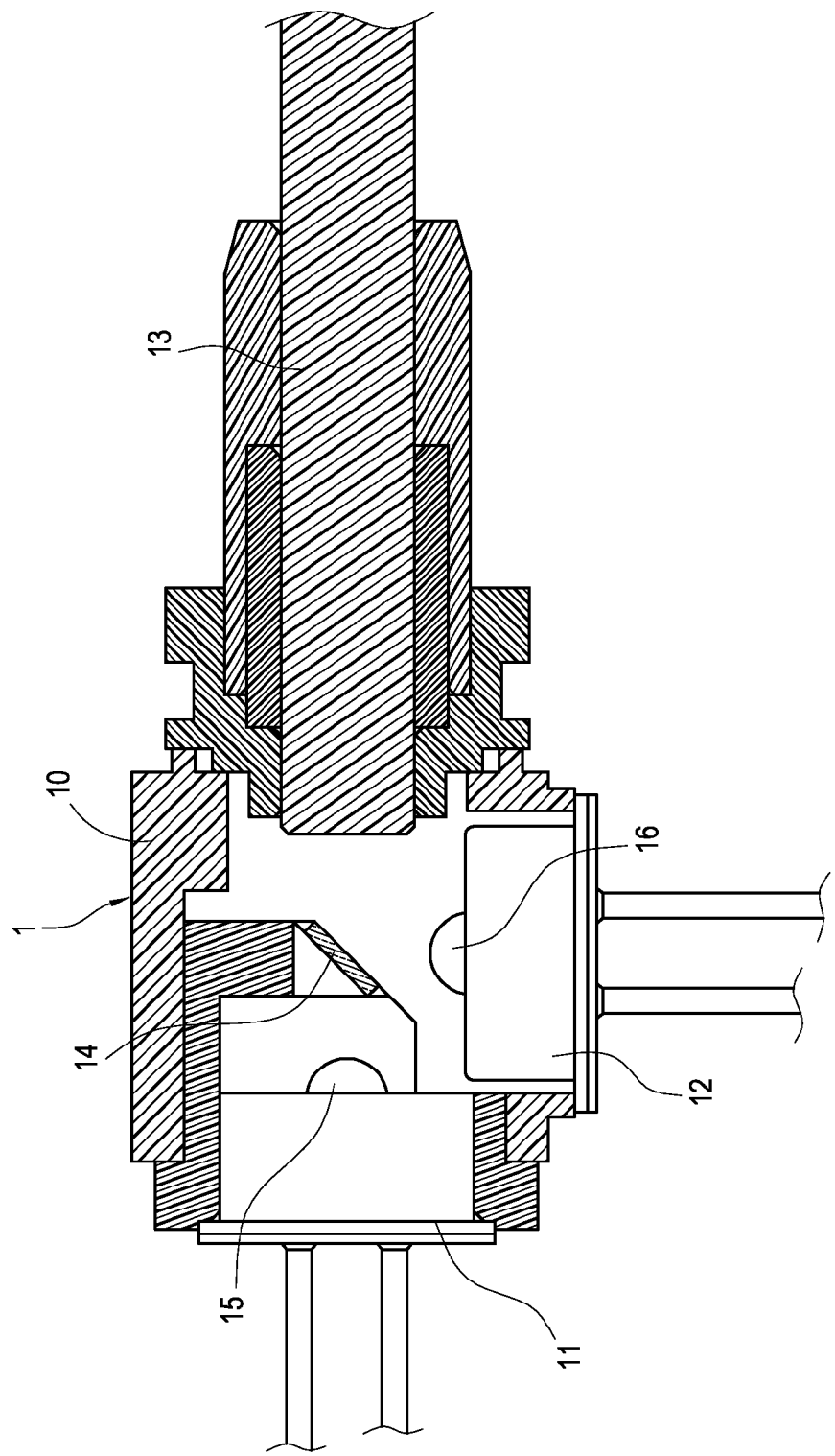
FIG. 1 is a sectional view of structural assembly of a bi-directional optical signal transmitting and receiving device in prior art.
Figure 2:
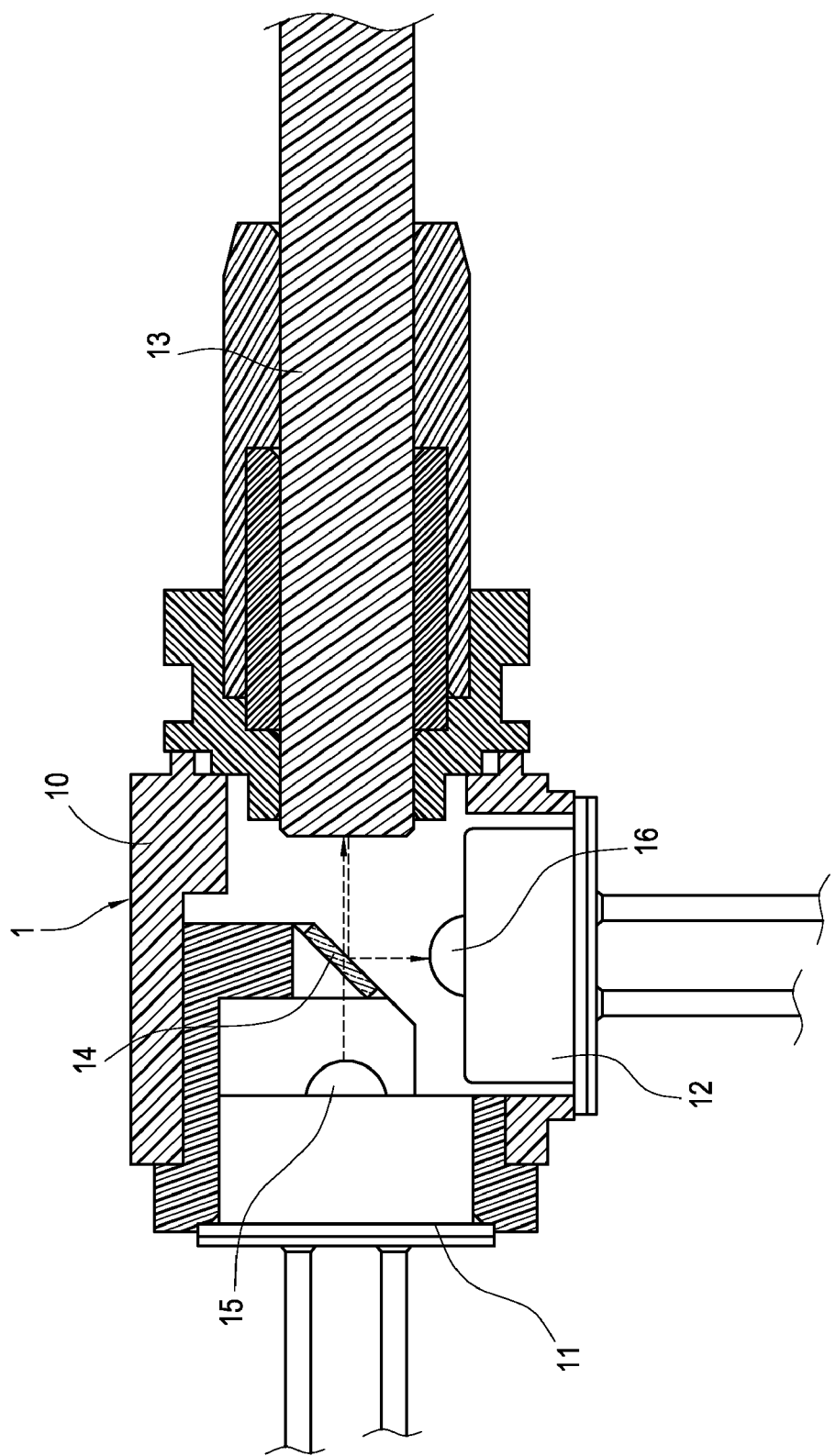
FIG. 2 is an illustration of a bi-directional optical signal transmitting and receiving device in optical signal transmitting and receiving state according to the prior art.
Figure 3:
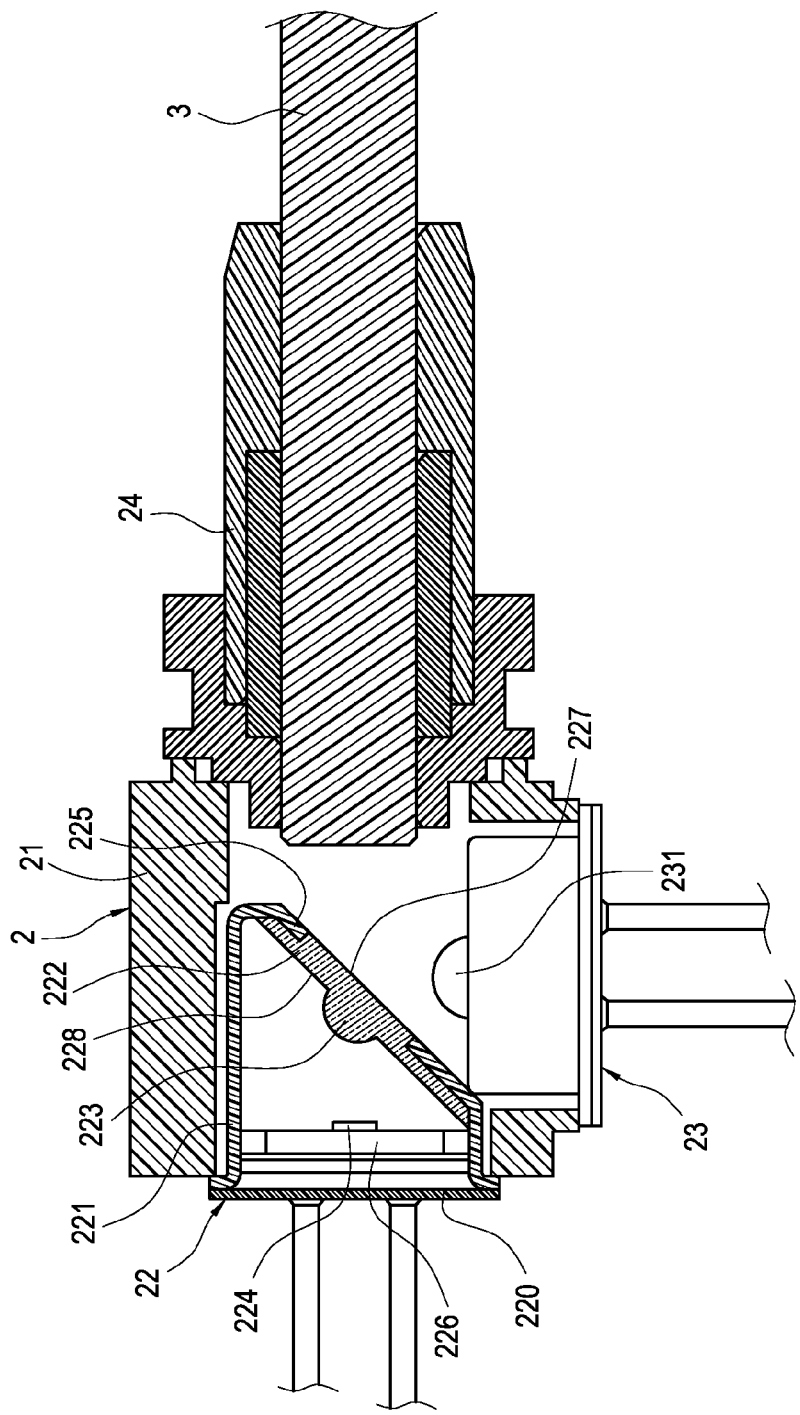
FIG. 3 is a sectional view of structural assembly of an embodiment according to the present invention.

Please refer to FIG. 3, which is an assembling sectional view of the present invention. As shown in this figure, the bi-directional optical signal transmitting and receiving device 2 is mainly comprised of a T shape shell 21, an optical transmitter 22, and an optical receiver 23. One side of two straight-through sides of the shell 21 is coupled to an optical fiber 3 via a sleeve 24, while optical transmitter 22 is fixed to another side, so that the beam path of optical transmitter 22 is in line with that of optical fiber 3. Optical receiver 23 is fixed to the third side of the shell 21, such that the beam path of optical receiver 23 is vertical to the beam path between optical fiber 3 and optical transmitter 22.

The optical transmitter 22 is comprised of a base seat 220 and a light-emitting component 224 that can be, for example, light-emitting diode (LED) or laser diode (LD), arranged on the base seat 220. An optical detector 226 is arranged under light-emitting component 224 and sealed relatively to base seat 220 by a cup shape lid 221, which in the meantime encloses both light-emitting component 224 and optical detector 226 to form a TO-can (Transistor Outline can) structure. The underside 225 of lid 221 is inclined 45 degrees to the beam path between optical transmitter 22 and optical fiber 3. The central part of lid 221 is a hollow window, on which a light splitting filter 222 is fixed. One side of the light splitting filter 222 facing optical receiver 23 is coated with a reflecting coating 227 that can make light beam coming from optical fiber 3 reflected vertically toward optical receiver 23. Another side of light splitting filter 222 facing optical transmitter 22 is also arranged with coating 228 that may make light beam coming from optical transmitter 22 directly pass through light splitting filter 222 and enter optical fiber 3 according to a transmission ratio set by the coating 228, while part of the light beam reflected by the coating 228 is received by the optical detector 226 to check if the laser light is transmitted normally. The side of light splitting filter 222 facing light-emitting component 224 is preferably arranged a focusing lens 223 to make the light beam emitted from light-emitting component 224 be more concentrated. In the same way, part of light beam functioned by focusing lens 22 is reflected by the coating 228 back to optical detector 226 for check.

Preferably, the optical receiver 23 may also be a TO-can framework, light-receiving surface of which may also preferably be arranged a focusing lens 231.

Figure 4:
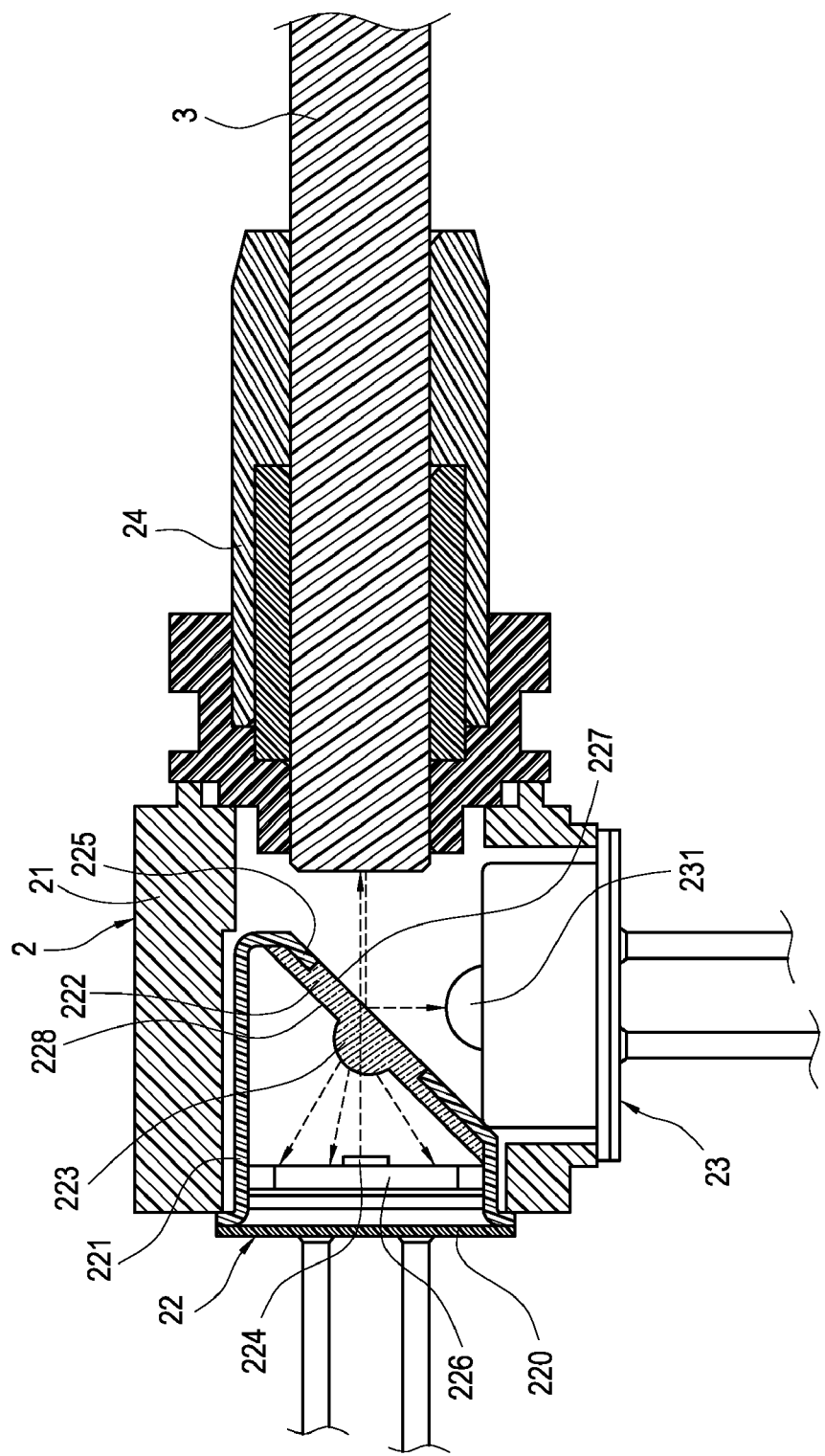
FIG. 4 is an illustration of an embodiment in optical signal transmitting and receiving state according to the present invention.

Please further refer to FIG. 4, which is an illustration of the optical transmitting and receiving device according to the invention in bi-directional optical signal transmitting and receiving state. As shown in the figure, after the optical signal transmitting and receiving device of the present invention has been assembled according to the components, the optical signal sent out by optical transmitter 22 is transmitted by the light splitting filter 222 of lid 222 and its coating 228 and then enters optical fiber 3 arranged co-axially, which will further transmit optical signal outwardly. The optical signal transmitted from optical fiber 3 toward optical transmitting and receiving device 2 is reflected vertically by reflecting coating 227 towards optical receiver 23 and is received therein.

Since the lid 221 of optical transmitter 22 and light splitting filter 222 is integrated as a TO-can framework instead of an individual light splitting filter in prior art, so the distances among light splitting filter, optical transmitter, optical receiver, and optical fiber are shortened. Not only make the total size of shell effectively shrunk, but also simplify production process and lower down manufacturing cost. In addition, the design of bi-directional optical transmitting and receiving device is more flexible.

Aforementioned structure is only a preferable embodiment of the present invention, being not used to limit its executing scope. Any equivalent variation and modification made according to appended claims is all covered by the claims claimed by the present invention.

What is claimed is:

1. A bi-directional optical signal transmitting and receiving device for connecting an optical fiber of bi-directional transmission, comprising:

a shell having two straight-through sides and a third side, wherein the optical fiber is connected to one of the straight-through sides;

an optical transmitter including a base seat and a light-emitting component, arranged at another one of the straight-through sides of the shell and in line with a beam path directed between the light-emitting component and the optical fiber, the optical transmitter having a Transistor Outline can (TO-can) structure with an indented lid mounted on the base seat to enclose the light-emitting component therein, wherein the indented lid comprises an underside being inclined 45 degrees to the beam path, and a light splitting filter is arranged on the underside with a focusing lens facing the light-emitting component formed thereon to make light beam emitted from the light-emitting component be more concentrated; and an optical receiver arranged at the third side of the shell and in corresponding to the light splitting filter, wherein the light beam emitted from the light-emitting component passes through the light splitting filter and enters the optical fiber while light beam coming from the optical fiber is reflected vertically toward the optical receiver via reflection of light splitting filter.

2. The bi-directional optical signal transmitting and receiving device as in claim 1, wherein the underside of the lid is arranged with a hollow window, on which the light splitting filter is fixed.

3. The bi-directional optical signal transmitting and receiving device as in claim 1, further comprising a reflecting coating on the light splitting filter and facing the optical receiver, whereby the light beam from the optical fiber is reflected vertically by the reflecting coating.

4. The bi-directional optical signal transmitting and receiving device as in claim 1, further comprising a coating on the light splitting filter and facing the light-emitting component and an optical detector arranged under the light-emitting component, whereby the coating reflects part of the light beam from the light-emitting component to the optical detector to check if the light beam from the light-emitting component is transmitted normally.

* * * * *